Figure 8:
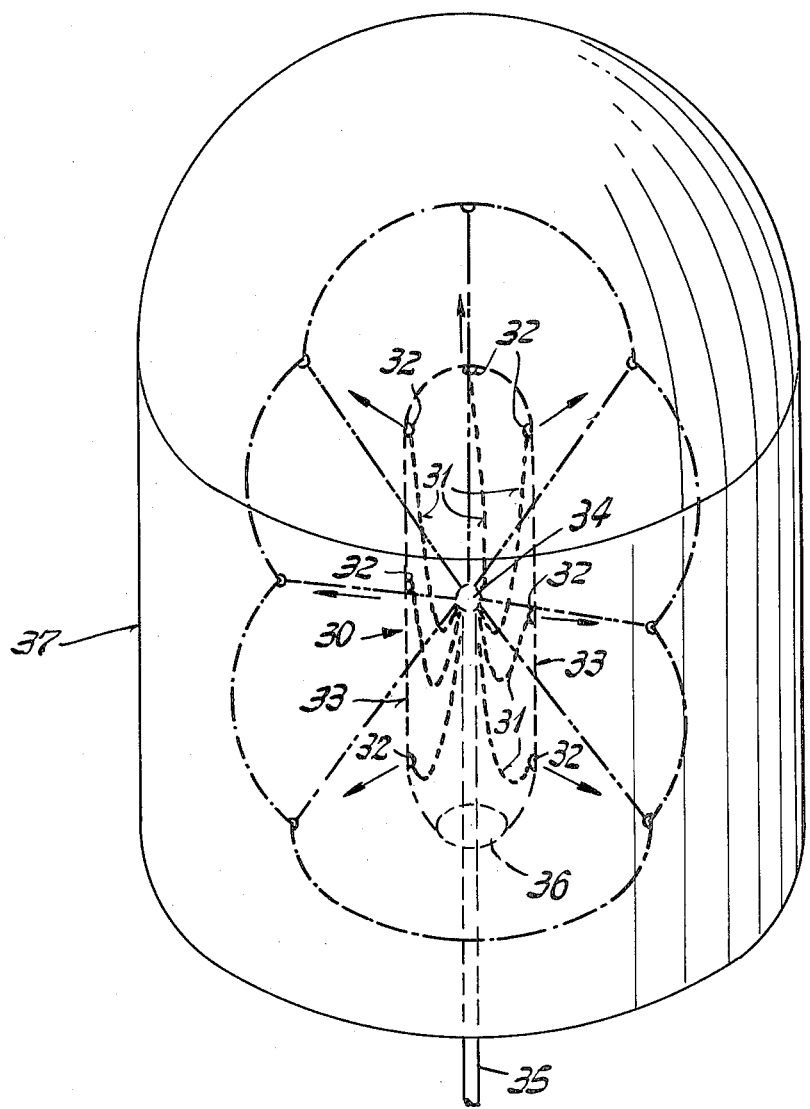

United States Patent [19]
Kirkpatrick

[11] 3,856,902
[45] Dec. 24, 1974

[54] MOLDING PROCESS FOR FOAMED ARTICLES USING AN EXPANDABLE MOLD WITH INNER AND OUTER RESTRAINTS

[75] Inventor: Harold B. Kirkpatrick, Easton, Conn.

[73] Assignee: Reichhold Chemicals, Inc., White Plains, N.Y.

[22] Filed: Oct. 24, 1972

[21] Appl. No.: 299,758

[52] U.S. Cl. ............... 264/45.2, 264/30, 264/45.5, 264/50, 264/52, 264/55, 264/73, 264/77, 264/DIG. 14
[51] Int. Cl. ........................................... C29d 27/00
[58] Field of Search .......... 264/45, 52, 55, DIG. 14, 264/30, 50, 73, 77

[56] References Cited
UNITED STATES PATENTS

| | | | |
|---|---|---|---|
| 2,801,199 | 7/1957 | Meyers | 154/110 |
| 2,977,639 | 4/1961 | Barkhuff et al. | 264/45 X |
| 3,059,253 | 10/1962 | Sager | 264/45 X |
| 3,310,615 | 3/1967 | Bender | 264/45 |
| 3,329,750 | 7/1967 | Growald | 264/45 |
| 3,357,142 | 12/1967 | Furrer et al. | 264/45 X |
| 3,403,676 | 10/1968 | Gibbons | 264/45 X |
| 3,589,967 | 6/1971 | Shirakawa | 156/287 |
| 3,736,201 | 5/1973 | Teraoka | 264/45 X |

*Primary Examiner*—H. S. Cockeram

[57] ABSTRACT

Process for molding articles from a thermoplastic or thermosetting foam-forming composition in such a manner that the expansion of the composition is permitted to proceed unrestrained in at least one direction to provide molded articles having a variety of artistic and functional free forms. Process involves the use of an inexpensive, highly flexible and expandable or inflatable mold, filling said mold with thermosetting or thermoplastic foam-forming composition, restraining said mold in at least one direction while leaving said mold free to expand in at least one other direction, and foaming said composition to expand said mold against said restraints and also in said direction in which it is free to expand to form a molded article having a free form.

3 Claims, 8 Drawing Figures

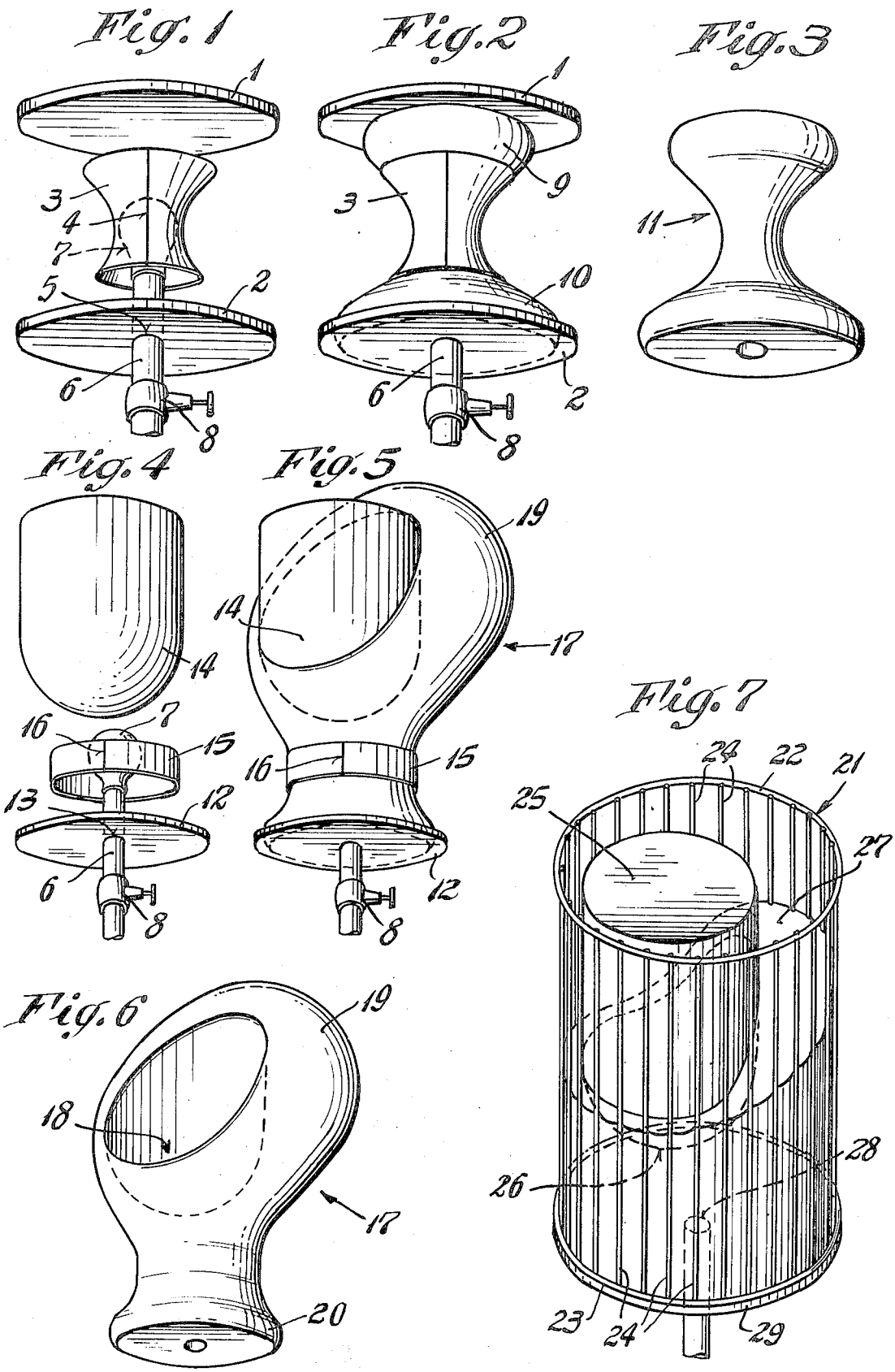

MOLDING PROCESS FOR FOAMED ARTICLES USING AN EXPANDABLE MOLD WITH INNER AND OUTER RESTRAINTS

There are a variety of known processes for molding articles, such as functional furniture, from thermosetting or thermoplastic foam-forming compositions. The most common compositions of this class are the polystyrenes and the polyurethanes, and the known processes for molding such compositions involve the use of conventional rigid molds or receptacles. The composition is introduced to the mold either before or after the mold is closed and clamped and the foaming action is caused to proceed within the closed mold whereby the composition expands in all directions to fill the mold with the foamed composition which, after the reaction is completed, is removed from the mold as a form-retaining molded foam having the shape of the mold.

In the conventional processes, the mold is prefabricated so as to have and provide a cavity having shape and size that reflect in their entirety the shape and size of the article to be molded. Furthermore, such molds must be sufficiently strong and rigid to retain size and shape in all directions in spite of pressures exerted against the cavity surfaces by the expanding foaming composition in order that the desired size and shape will be imparted to the molded article.

Such conventional shape and size imparting rigid molds are expensive, particularly in the case of molds large enough to produce furniture such as chairs, couches, and the like, and/or when mold pressures are high. Also, rigid molds produce molded articles which are identical to each other and have a predetermined fixed shpae which generally represents a compromise between articles of different shapes. Furthermore, each differently shaped article will require that a complete new mold be provided. The filling of rigid molds with the foam-forming composition also involves the hazard that the composition may not completely or uniformly wet the inner mold surface and may trap air pockets, whereby the molded article may have surface defects, blemishes or blisters which are sufficiently serious that the article has to be rejected.

It is the principal object of the present invention to provide a novel process for molding thermosetting and thermoplastic foam-forming compositions in such a manner that molded articles of different shapes, dimensions and surface effects may be produced without first making expensive conforming molds.

It is another object of this invention to provide a novel process for molding such compositions by using shape-imparting restraints in or with molds which are so inexpensive that they can be disposed of or which may be retained as a part of the molded article, e.g., to serve as the covering (skin) or upholstery material.

It is another object of the present invention to provide a novel molding process which is more efficient in that it substantially avoids the production of molded articles which are rejectable because of surface defects, blemishes and blisters.

It is still another object of the invention to provide a novel molding process for thermosetting and thermoplastic foam-forming compositions which makes it possible with minimal investment in tooling to form molded articles having variable interior as well as exterior surface dimensions and configurations.

These and other objects and advantages of the present invention will be apparent to those skilled in the art in view of the present description including the drawings, in which:

FIG. 1 is a perspective view of a restraint system suitable for the molding of a table, FIG. 2 is a perspective view of the system of FIG. 1 containing the mold expanded to final shape, FIG. 3 is a perspective view of the table of FIG. 2 after removal from the expanded mold, FIG. 4 is a perspective view of a restraint system suitable for the free molding of a contour chair, FIG. 5 is a perspective view of the system of FIG. 4 containing the mold expanded to final shape, FIG. 6 is a perspective view of the contour chair molded according to FIG. 5 and including the expanded mold as a surface covering, FIG. 7 is a perspective view of a restraint system suitable for the free molding of a contour chair or the like, and FIG. 8 is a perspective view of an inner restraint system capable of a variety of uses according to other embodiments of the present invention.

The objects and advantages of the present invention are accomplished by means of my discovery of a novel process for molding thermoplastic and thermosetting foam-forming compositions using a highly expandable mold in association with restraints which limit the expansion of the mold in at least one direction while permitting the free expansion of the mold in at least one other direction. The present process involves the use of expandable molds, which are inexpensive compared to preformed rigid molds, can be restrained in a number of different directions to produce molded articles having a number of different shapes and surface effects and can be retained on the molded article as a surface covering for protective or decorative purposes.

According to the present molding process, the expandable mold has a smaller interior surface area when it is filled with the foam-forming composition than it has after the molding step is completed. The liquid foam-forming composition is able to fill and uniformly wet the interior surface of the mold to the exclusion of air pockets, and since the composition and the mold expand together, there is little or no possibility to produce molded articles having suface defects, blemishes or blisters.

The accompanying drawings illustrate three different restraint systems suitable for use according to the present invention. Variations of the illustrated systems are also possible as will be discussed more fully hereinafter.

The restraint system of FIG. 1 comprises restraining plates 1 and 2 which are in fixed positions opposite to each other and a central collar restraint 3 in fixed position between plates 1 and 2. If the collar 3 is to be removed from the final article, it may be adapted to be opened along dividing line 4. Plate 2 is provided with a central hole 5 to receive injection tube 6, the end of which is connected to the interior of expandable mold 7. The injection tube 6 is also provided with a shut-off valve, closure or clamp 8.

The restraint systems of the present invention, such as that of FIG. 1, may be pretested to determine the desired location of the central collar 3 or the desired dimensions of the article to be molded by first introducing air through tube 6 to inflate the expandable mold 7 until its shape conforms to the desired shape of the table to be molded, adjusting the position of collar 3 if necessary. The mold is then deflated and the volume of air removed can be measured to indicate the exact volume of foam to be formed to produce the desired shape. Next the exact volume of foam-forming composition required to produce the predetermined volume of foam is introduced to the inflatable mold 7 through injection tube 6 and the valve 8 is closed.

Initiation of the foaming reaction causes the expansion of the composition within the inflatable mold 7 whereby the mold expands freely in all directions until restrained, initially by the central collar restraint 3 and then by the plate restraints 1 and 2. As illustrated by FIG. 2, the mold 7 is permitted to expand freely in top section 9 and base section 10 because of the absence of restraints in the areas between collar restraint 3 and plates 1 and 2. The charging nozzle of the foam dispensing machine and the injection tube are designed to provide for free displacement by the foam-forming composition of the air in the mold.

After the completion of the foaming reaction, setting and partial curing of the foamed composition, the solidified form-retaining molded table 11, shown in FIG. 3, is removed from the restraining system such as by withdrawing the injection tube 6, removing the mold-encased table from between plates 1 and 2, opening and removing the collar 3 and finally peeling the expandable mold 7 from the surface of the foamed table. However, if desired, the mold 7 may be retained on the table as a surface covering and a solid collar 3 may also be retained for decorative purposes.

If desired, the central collar 3 may be replaced by an inflated inner tube which is centered between plates 1 and 2 to function as the central restraint. After the completion of the foaming reaction, the inner tube can be deflated and removed from the molded article.

As another variation made possible by the novel process of the present invention, the expandable mold may be twisted prior to the setting of the molding composition to provide additional aesthetic effects. Referring to FIG. 2, for instance, plate 1 can be rotated relative to plate 2 to the desired extent, such as 180°, to cause the expandable mold to take on spiral distortions which are imparted to the molding composition as it sets and hardens.

FIG. 4 illustrates another restraint system useful for molding a free form element provided with a contour recess, such as a chair. The system of FIG. 4 has a base plate 12 provided with a central opening 13 to receive the injection tube 6 and attached expandable mold 7. The other vertical restraint is contour restraint 14 which has a hemispherical base and which is positioned so that its vertical axis is slightly offset from the vertical axis of the expandable mold 7 and injection tube 6. A central collar 15 having a dividing slit 16 is centered around the expandable mold about midway between the surface of the base plate 12 and the base of contour restraint 14. Air can be injected through tube 6 to inflate mold 7 to determine whether the restraints are positioned properly to provide the desired final shape, and the volume of the injected air can be measured to provide a measurement of the proper amount of foam-forming composition to be introduced after the mold is deflated.

FIG. 5 shows the mold of FIG. 4 after the foam-forming composition has been introduced through injection tube 6, the valve 8 has been closed and the foaming reaction has been completed. The expandable mold 7 expands against collar 15 where its horizontal expansion is restrained. The mold then expands vertically until restrained by plate 12 and contour restraint 14. Since the latter is rounded and offset, it functions as a semi-restraining guide which causes the mold to expand around it in the manner illustrated.

After the reaction is completed and the foamed composition has set to a strong, rigid or flexible self-supporting structure, the article is removed from the restraints and injection tube and comprises a contour chair 17 having a recessed seating area 18, back-supporting area 19 and rounded base 20.

FIG. 7 of the drawings illustrates another type of restraint system, namely an open restraint which permits the free expansion of the mold to produce attractive surface features in the final molded article.

Referring to FIG. 7, an outer cylindrical restraint 21 is provided which comprises open hoops 22 and 23 connected to each other by a series of parallel rigid rods or wires 24. An inner restraint 25 is secured in position within restraint 21, the inner restraint comprising a solid cylinder having a hemispherical base 26 which will form the seat of the chair to be molded. The expandable mold 27 is illustrated in expanded position, having been filled by the foam-forming composition introduced through the central hole 28 in the rigid base plate 29 secured to the base hoop 23.

In use, the system of FIG. 7 has the injection tube inserted through opening 28 of the base plate 29. Air may be introduced initially, if necessary, to determine the desired shape and/or the quantity of foam-forming resin required. After the resin composition has been introduced and the foaming reaction completed, the mold 27 is expanded to the shape illustrated. The foam-forming composition and the mold expand upwardly against the hemispherical base 26 and between restraints 21 and 25 to cause the uppermost area of the mold to take on a free form. The mold also expands uniformly between the parallel rods 24 to acquire a fluted surface.

Finally the injection tube is withdrawn and the molded article is removed from cylindrical restraint 21 as a molded chair having a decorative fluted surface covered by the expandable mold. The base of the chair comprises the base plate 29. The recessed seating area may be provided with a cushion, if desired, and legs or casters may be attached to the base to provide different types of chairs.

If desired, the hemispherical base 26 of the inner restraint 25 may also be molded. Thus it may comprise an expandable cover which is secured to the inner restraint cylinder base and which is filled with sufficient molding composition to provide the desired hemispherical or other shape on expansion. Also the base 26 may be molded against a female pattern mold so as to acquire surface texture or decorative properties which are then imparted to the seating area of the molded chair.

A modification of the embodiment of FIG. 7 is possible whereby the cylindrical restraint 21 is encased within an expandable mold, such as a cylindrical mold which encases restraint 21, and the whole assembly is contained within a pressure chamber. The air pressure on the outer expandable mold forces the mold inward between the rods 24 and against the expandable mold 27 whereby a molded article having a reverse-fluted surface is obtained. The depth of the reverse-fluting is controlled by balancing the external air pressure, i.e., the pressure in the outer cylindrical mold, against the pressure of the inner expanding mold.

As will be apparent to those skilled in the art in the light of the restraint systems illustrated by the drawings, a great variety of free forms and shapes may be molded according to the novel process of the present invention using a great variety of restraints having different shapes and surface contours or surface features such as roughness, intaglio or relief designs, and the like, which produce aesthetic and/or functional features on the final molded articles.

The expandable molds used according to the present invention are also capable of wide variation in terms of shape, construction and composition, depending upon the end use to which they are applied. The expandable mold is preferably formed of stretchable natural rubber or synthetic thermoplastic or thermoset elastomer capable of being elongated to at least about two times its original dimensions in all directions, and preferably to at least about six to seven times its original dimensions. The preferred elastomers are the stretchable polyurethanes, vinyl resin films and latex rubbers which are now commercially-available for a variety of uses. Also suitable are the butadiene rubber polymers and copolymers such as with styrene and/or acrylonitrile. The particular composition of the expandable mold is not critical providing that it has the required elongation. However, obviously some such materials have properties such as strength and durability which make them better adapted to certain uses according to this invention, particularly where they are retained on the final molded article as a decorative or protective covering.

In this connection, the polyurethane and vinyl elastomers are preferred since they have the desired properties and may be produced so as to have surface properties of roughness, texture or grain and in colors so as to simulate leather, wood, woven fabric or substantially any material from which furniture and other items are normally fabricated and/or covered. Also flock such as linters or fine particles of cotton, wool, silk or synthetic filaments may be bonded to the outer surface of the expandable mold to provide a material which, after expansion, has the feel and appearance of fabric. The finished piece may be sprayed in conventional manner with a flexible pigmented coating simultating leather or other material.

A variety of decorative effects on the surface of molded articles can be achieved by applying multiple layers of elastomeric material to either male or female patterns in making expandable molds. For example a clear coat applied on the pattern followed by color chips and a final coat of pigmented elastomer will impart a three dimensional decorative surface on the molded article. Alternatively, the color chips can be replaced by colored spider web patterns or by the use of nonthixotropic pigmented spray which is allowed to "run." By this technique, freely-formed non-objective line patterns can be imposed between two layers of clear elastomer or between the clear on the outer surface and opaque on the inner surface. Construction of the expandable mold may itself be varied to impart or control shape. For example, the degree or extent of stretchability may be predetermined in selected areas or patterns such as by introducing extra thickness, tapes or cords in portions of the mold during its fabrication. Gouda cheese or pumpkin shape are examples. As in the case of modular restraints themselves, a wide variety of possibilities will be obvious to those skilled in the art.

The molding compositions suitable for use according to the present invention vary somewhat depending upon the properties desired in the article being molded. For instance, surface hardness and rigidity are desirable for scratch resistance in the case of molded tables while surface give or cushion is desirable in the case of chairs, sofas and the like.

The preferred molding compositions are the foam-forming polyurethanes which are commercially-available in a variety of compositions to produce molded articles having a variety of degrees of rigidity or softness and resiliency and having surface harness similar to Formica or surface softness similar to leather or soft vinyl combined with comfort cushioning. Such compositions contain resinous reactants which, in the presence of a small amount of volatile liquid such as methylene chloride or fluorocarbon (such as Freon 11 or Freon 113), or mixtures thereof, or water (which reacts with the isocyanate to generate carbon dioxide gas), produce a foam-forming reaction and form an expanded cellular or porous structure. Also, while the reaction is exothermic, the amount of liberated heat is not sufficient to damage the expandable mold or the restraints.

Such polyurethane compositions include the polyester and polyether polyurethanes produced by the reaction of a polyester or a polyether Polyol with an isocyanate such as toluene diisocyanate or a polymeric isocyanate in the presence of a small amount of water and/or fluorocarbon. A suitable polyester, for example, is one produced by reacting diethylene glycol, adipic acid and trimethylol propane. If the polyester has a high hydroxyl number, the formed polyurethane is relatively rigid, whereas a low hydroxyl number polyol provides a relatively flexible polyurethane. In carbon dioxide blown systems, the polyisocyanate is used in a molar excess to allow for reaction with water to form the carbon dioxide blowing agent. Blocked urethanes, epoxy resins, acrylic resins and other resin types in liquid, powder or granular form and incorporating heat-activatable chemical blowing agents are suitable foamable materials.

It is also possible to use other liquid or particulate foamable resin systems including polymerizable monomers and/or low molecular weight liquid polymers capable of further reaction to form high molecular weight solid resins. Also suitable are polyesters, polystyrene, polyethylene, polypropylene, polyvinyl chloride, and the like. Foam-formation is accomplished by the inclusion of a small amount of a commercially-available blowing agent which decomposes or boils during the polymerization to evolve a gas which expands the polymer. The blowing agent is one which is activated at a temperature sufficiently low that it does not damage the expandable mold.

The following example is given as an illustration of one embodiment of the present process in which a table is molded, using the restraint system of FIG. 1.

A balloon of polyurethane elastomer, commercially-available under the Trademark Urotuf, is selected for use as the expandable mold 7. The size of the balloon is such that when inflated to capacity, without elongation, it has a diameter of 6 inches, and the composition and wall thickness is such as to permit 6 times elongation under moderate pressure.

The stem of the empty expandable mold is attached to the top opening of the injection tube 6, by means of a suitable clamping device, and a measured amount of air is introduced into the mold to cause it to expand to the desired shape, the air flow being controlled by means of valve 8 on tube 6. The volume is determined to be 5,750 cubic inches. The mold is then deflated.

The foam-forming composition used is a rigid foam-forming liquid composition commercially-available under the Trademark Polylite Polyurethane Resin. The weight required to form a 5,750 cubic inch capacity foamed molded article is 10 pounds so 10 pounds are introduced through valve 8 and injection tube 6 into the mold 7 and the valve is closed.

The foaming reaction proceeds with the generation of a small amount of heat and the mold expands into contact with the central collar 3 and then above and below the collar into contact with restraining plate 1 and then plate 2. Expansion continues, forcing the mold to bulge freely in the unrestrained areas between the collar and plates 1 and 2 until expansion ceases due to the completed foaming reaction of the molding composition. The expanded mold has the appearance shown in FIG. 2.

The tube 6 is withdrawn from the center hole 5 of plate 2, to disconnect it from the expanded mold, and the latter is removed from between plates 1 and 2. The center collar restraint is opened along slit 4 and removed from the expanded mold and the mold is peeled from the molded table 11.

It is clear that a number of variations in size and shape are possible for the articles molded according to the present invention through the use of the same expandable mold and the same combination of modular restraints placed in different arrangements. In many cases, particularly for the molding of large articles or of articles which are to retain the mold as a surface covering, it is preferred to employ an expandable mold which is preformed in the general shape of the article to be molded but in a much smaller size. In this manner, the expansion of the mold places approximately the same stress on the mold in all directions so that the stretched mold has a substantially uniform thickness, appearance and strength.

The expandable mold may be produced in the form of a balloon, bag, cylinder, cube, flat sheet, or the like, depending upon the manner of use. The production of the preshaped type mold is carried out in a manner well known for the manufacture of conventional balloons and stretchable bags. One such method involves the dipping of a male mold of the desired shape into a viscous solution of the elastomer composition, withdrawing the mold coated with the composition, evaporating the solvent and removing the dried balloon from the male mold. Another is by spraying onto the surface of a male or female pattern. Male patterns can be used if the depth of the pattern surface and the thickness of the elastomer film are correlated, and the mold produced may be turned inside out, if desired. The use of double expandable molds provides a simple method of imparting a texture to the molded piece when using female patterns. The pattern is lined with an embossed thermoplastic film and spray-coated with an expandable elastomeric inner coating. After cure, the inner coating is released from the thermoplastic film and is used as an expandable mold. Another method is rotational or slush casting in female molds provided with a release coating. The preferred ballooning compositions used according to the invention are the polyurethane elastomers commercially-available under the Trademark Urotuf, and the vinyl elastomers.

The female pattern used to form the expandable mold may be provided with surface texture, roughness, grain or pattern which will be imparted to the surface of the ballooning composition formed thereagainst, and the composition may be colored as desired. If a male pattern is used, it preferably is deflatable to simplify removal of the mold, and the mold must be turned inside out so that the surface texture will be on the mold exterior.

According to another embodiment of the invention, illustrated by FIG. 8, the expandable mold 30 may also be provided with a number of inner restraints such as wires or cords 31 attached to predetermined areas 32 of the interior surface of the mold and having different degrees of slack or stretchability, as may be controlled by spring-loading means, whereby the expansion of the mold is restrained in these areas to a predetermined controlled degree while free expansion of the mold can occur in areas 33 between these points of restraint. In this manner a functional molded article of the desired shape can be produced, as shown by means of broken lines in FIG. 8, such as a cushion or hassock having a dimpled surface and having the mold retained thereon as a surface covering. The shape and size are predetermined by inflating the inner mold with air and determining the amount of stress on each of the wires or cords required to restrain the mold to the desired size and shape. The direction of the wires or cords is controlled by the use of a pulley 34 present on a rigid rod 35 which is inserted into the mold through the air induction port 36 of the mold. The amount of stress on each cord or wire may be measured by a stress gauge and remains unchanged during the molding operation since an equilibrium is established between the air pressure within the inner mold and the pressure exerted by the expansion of the foam-forming composition within the outer mold.

According to this embodiment of the invention, expandable molds 30 and 37 containing different foam-forming compositions may be used, one within the other, to produce unitary molded articles formed in a single operation and having different properties of strength, flexibility and/or softness in preselected areas. For instance, an interior expandable mold 30 may be filled with rigid foam-forming composition while an exterior expandable mold 37 may be filled with flexible foam-forming composition. During the single molding operation the interior mold expands and sets to a rigid resin foam which functions as a support for the flexible foam which forms within the exterior mold 37. Thus a chair, for instance, may be formed which is strong and yet has a soft and comfortable exterior surface. If desired, three expandable molds may be used, the innermost mold having interior cord restraints and being inflated with air to form a hollow core, as discussed supra.

This integral molding operation may be performed in association with conventional rigid molds to produce molded articles formed from a combination of different compositions having different physical properties in a single operation. Current techniques involve the use of a solid preformed insert around which a single composition is molded, or the use of successive molding operations, each using a different molding composition. The present concept of using inflatable molds, one within the other and each containing different molding compositions, in a single molding operation, reduces operating cycles by 50 percent or more and results in more unitary and stable products.

A variation of this embodiment involves the use of two expandable molds, one within the other, to produce a hollow core for purposes of conserving material or producing lighter weight articles. The inner restraints are used in the inner mold which is inflated with air to the desired dimensions. The outer mold is filled with the required amount of foam-forming composition and is expanded in association with the desired restraint system. The air-inflated inner mold functions as an inner restraint and the molded article has a hollow core of the desired shape and size.

According to still another embodiment, the restraint system may be in the form of a series of interconnected exterior wires or cords which surround the expandable mold and restrain the expansion thereof except in areas between the wires or cords. For instance, a wire hollow sphere restraint can be used, in which the wires extend from one pole to the other, to mold an article having the surface appearance of a pumpkin. Variations of the shape of the restraint make it possible to mold less spherical articles such as hassocks having surface ridges, or doughnut-shaped articles.

The present novel process also makes it possible to use expandable molds which are preformed with seams, heat-treated areas, adhesive restraints, built-up tapes or cords, or the like, which reduce the expansion of the mold at preselected areas to provide functional or decorative surface features in the final product such as a tufted or ribbed appearance. Since the stretchability of the expandable mold composition is a direct function of the thickness or number of film plies, then it is possible to seam or spray coat the mold in preselected areas and to preselected degrees to produce molds having areas of predetermined resistance to stretching.

It should be understood that the present process and materials are capable of use in miniaturized scale as a challenging educational or hobby craft.

Variations and modifications may be made within the scope of the claims and portions of the improvements may be used without others.

I claim:

1. Process for molding foam-forming synthetic resinous compositions into predetermined shapes comprising the steps of providing an expandable mold formed of an elastomer capable of being expanded to a size greater than its original surface dimensions, positioning said mold so that its outward expansion is restrained by at least two exteriorly placed restraining elements which are not integral with said mold and which are capable of limiting the expansion of portions of the mold while other portions are free to undergo expansion, and by at least one interiorly placed inner restraint which is not integral with said mold and which is capable of limiting the expansion in an inner direction, inserting into said mold a predetermined amount of foam-forming synthetic resinous composition and expanding until restrained by said inner and outer restraints and allowing other portions of said mold to undergo unrestrained expansion and allowing said foamed composition to cure and solidify within said expandable mold.

2. The process as defined in claim 1 wherein the foam-forming synthetic resinous composition is selected from the group consisting of polyurethane, polyester, acrylic, polystyrene and polyethylene resins.

3. An article produced according to the process of claim 1.

* * * * *